United States Patent
Losh (10) Patent No.: US 10,606,510 B2
(45) Date of Patent: Mar. 31, 2020

(54) MEMORY INPUT/OUTPUT MANAGEMENT (71) Applicant: NETFLIX, INC., Los Gatos, CA (US)

(72) Inventor: M. Warner Losh, Broomfield, CO (US)

(73) Assignee: Netflix, Inc., Los Gatos, CA (US)

(*) Notice: Subject to any disclaimer, the term of this patent is extended or adjusted under 35 U.S.C. 154(b) by 0 days.

(21) Appl. No.: 15/268,368

(22) Filed: Sep. 16, 2016

(65) Prior Publication Data
US 2017/0123730 A1 May 4, 2017

Related U.S. Application Data (60) Provisional application No. 62/248,215, filed on Oct. 29, 2015.

(51) Int. Cl.
- G06F 12/00 (2006.01)
- G06F 12/08 (2016.01)
- G06F 13/00 (2006.01)
- G06F 3/06 (2006.01)

(52) U.S. Cl.
CPC ............ *G06F 3/0659* (2013.01); *G06F 3/067* (2013.01); *G06F 3/0611* (2013.01); *G06F 3/0679* (2013.01)

(58) Field of Classification Search
CPC ...... G06F 3/0659; G06F 3/067; G06F 3/0619; G06F 3/065; G06F 3/0611
USPC ........................................................ 711/103
See application file for complete search history.

(56) References Cited

U.S. PATENT DOCUMENTS

| | | | | |
|---|---|---|---|---|
| 6,629,220 B1* | 9/2003 | Dyer | ................... | G06F 13/1642 710/220 |
| 7,836,502 B1* | 11/2010 | Zhao | ................... | G06F 21/6218 726/22 |
| 8,370,395 B1* | 2/2013 | Gupta | ................... | G06F 3/0614 707/799 |
| 8,874,836 B1* | 10/2014 | Hayes | ................... | G06F 3/0659 711/103 |
| 2003/0026265 A1* | 2/2003 | Brouwer | ............. | H04L 12/6418 370/395.42 |
| 2007/0233896 A1* | 10/2007 | Hilt | ......................... | H04L 47/10 709/238 |
| 2008/0222640 A1* | 9/2008 | Daly | ..................... | G06F 9/4881 718/103 |
| 2008/0301709 A1* | 12/2008 | Ban | ..................... | H04L 12/1813 719/314 |
| 2011/0131385 A1* | 6/2011 | Henriksson | ......... | G06F 13/1642 711/158 |

(Continued)

*Primary Examiner* — Mohamed M Gebril
(74) *Attorney, Agent, or Firm* — FisherBroyles, LLP (57) ABSTRACT A system for managing memory input/output management is provided herein. The system may include a processor and a memory storing machine-readable instructions that when executed by the processor, cause the system to perform operations including receiving read requests for first data stored on a solid-state storage drive, receiving write requests for second data to be stored on the storage drive, placing at least some of the read requests in a first queue, placing at least some of the write requests in a second queue, the second queue having a size limit, processing data at a disk driver layer from the first queue and the second queue in a manner such that selection of a request from either queue is biased towards the first queue. Associated methods are also included.

20 Claims, 8 Drawing Sheets (56) References Cited

U.S. PATENT DOCUMENTS

| | | | | |
|---|---|---|---|---|
| 2012/0180060 A1* | 7/2012 | Daly | ............ | G06F 9/4881 718/103 |
| 2014/0082288 A1* | 3/2014 | Beard | ............ | G06F 12/0875 711/123 |
| 2014/0082385 A1* | 3/2014 | Reule | ............ | G06F 1/266 713/320 |
| 2014/0101381 A1* | 4/2014 | Svendsen | ............ | G06F 13/1642 711/105 |
| 2014/0115241 A1* | 4/2014 | Wei | ............ | G06F 12/0246 711/103 |
| 2015/0113091 A1* | 4/2015 | Thiyam | ............ | G06F 12/0815 709/214 |
| 2015/0331633 A1* | 11/2015 | Yang | ............ | G06F 16/9574 711/119 |
| 2016/0057226 A1* | 2/2016 | Bestler | ............ | G06F 11/1076 709/217 |
| 2016/0191509 A1* | 6/2016 | Bestler | ............ | G06F 16/2255 713/163 |

* cited by examiner

MEMORY INPUT/OUTPUT MANAGEMENT

PRIORITY INFORMATION

This application claims the benefit of U.S. Provisional Patent No. 62/248,215 filed Oct. 29, 2015 and entitled "Approach for Input/Output Scheduling," the disclosure of which is hereby incorporated by reference in its entirety.

TECHNICAL FIELD

The present disclosure relates generally to input/output management of a computing system for use in the distribution of media items including audio and video over a network to a large collection of users.

BACKGROUND

While consumers may access media items, such as movies and television shows, by receiving over the air signals or by subscribing to a cable or satellite television provider, increasingly consumers are accessing content over Internet-based systems. Some Internet-based systems allow users to download or stream content over the Internet to a variety of client devices. For example, an Internet-based media system may provide content to users via a personal computer, a set-top box, or a personal mobile device, such as a smart phone or tablet computer. In particular, streaming media systems enable users to access media content in a stream, such that the users may begin consuming (e.g., watching and/or listening to) content before the entirety of the content is delivered to the user's client device. Such a system allows users to access content while avoiding a potentially lengthy download process before beginning to consume their selected content.

To provide high-quality content, content service providers may use multiple servers at various locations in the Internet. Each server may store at least some or all of the content provided by the content service provider. When the content service provider intends to make new content available to users, such new content is transferred to the memory storage systems of the servers. Typically, the servers discontinue providing content to users while new content is being transferred to the server because access quality may be adversely affected while data is being written to the memory storage systems. In other words, the write operations being applied to the memory storage systems may increase the latency of the read operations being applied to the memory storage system. It would be desirable, however, to have the ability to load new content on the servers while still allowing the servers to provide content to users with little or no effect on the quality of service.

These drawings will be better understood by those of ordinary skill in the art by reference to the following detailed description.

DETAILED DESCRIPTION

With reference to the drawings briefly described above, exemplary applications of systems and methods according to the present disclosure are described in this section. These examples are provided to add context and aid in the understanding of the invention. It will thus be apparent to one skilled in the art that the present invention may be practiced without some or all of these specific details. In other instances, well-known process steps have not been described in detail in order to avoid unnecessarily obscuring the present disclosure. Additionally, other applications of the concepts and principles described herein are possible, such that the following examples should not be taken as limiting. For example, while many of the examples disclosed herein are directed to streaming media, the principles and concepts described may be applied to provide recommendations in a system that additionally or alternatively provides media items for consumption in other manners, such as purchase, rental, download, etc.

In the following detailed description, references are made to the accompanying drawings, which form a part of the description and in which are shown, by way of illustration, specific embodiments of the present disclosure. Although these embodiments are described in sufficient detail to enable one skilled in the art to practice the invention, it is understood that these examples are not limiting, such that other embodiments may be used, and changes may be made without departing from the spirit and scope of the invention.

Devices, systems and methods are provided for managing I/O requests on a content server. In various particular embodiments, the devices, systems or methods involve one or more devices in communication over a network to provide users with streaming media items for consumption (e.g., to watch and/or to listen to). In other embodiments, the devices, systems, and methods involve facilitating the download of media items for consumption.

As described above, it would be desirable to load new content on a server while still allowing that server to provide content to users with little or no effect on the quality of service. Some servers may utilize solid state drives (SSDs) to store media items to be provided as content to users. SSDs may provide faster read times that other storage mechanisms, such as magnetic or optical storage devices, allowing content stored on an SSD drive to be provided to content consumers more efficiently. SSDs, however, have various characteristics that should be taken into account.

One such characteristic is write amplification, which is a phenomenon in which the amount of actual physical data written to the SSD drive is greater than the amount of logical data intended to be written to the drive. For example, if a host system instructs a SSD memory module to store 4 kilobytes of data, the total number of write operations to store those 4 kilobytes of data may total 8 kilobytes of data. This is because to write to an SSD memory cell, that memory cell is first erased before the new data is written. Furthermore, SSD systems are typically designed such that erase operations cannot be performed on a single memory cell. Instead, erase operations can only be performed on a set of memory cells, referred to as an erase block. When erasing data from an erase block, any data within the erase block that is not intended to be erased has to be rewritten when any new data is written to that erase block. Thus, the actual number of write operations is amplified due to the requirement of having to rewrite data to certain cells. Write amplification and other factors contribute to the increased latency of read operations when write operations are concurrently being requested of the same SSD.

According to principles described herein, I/O requests are sorted into at least two queues, including at a read queue and a write queue. This sorting may be done in the lower levels of the I/O stack. This is in contrast to conventional systems in which both read requests and write requests are put into the same queue. By splitting read requests and write requests into separate queues, various techniques may be applied to reduce the latency of read requests while write requests are being processed as well. In some examples, a scheduler can be configured to process requests from both queues with a bias towards the read queue. In some examples, a size limit may be applied to the write queue. Using such techniques, a memory module can more efficiently handle both read and write requests without a substantial effect on the latency of read requests.

Principles described herein may also be applied in a manner such that write requests are favored over read requests. For example, there may be scenarios in which it is desirable that preference be given to write requests. In such cases, a size limit may be placed on the read queue and the I/O scheduler may be biased towards processing of requests from the write queue.

Reference throughout the specification to "various embodiments," "some embodiments," "one embodiment," "an embodiment," "various examples," "one example," "an example," or "some examples" means that a particular feature, structure, or characteristic described in connection with the embodiment or example is included in at least one embodiment. Thus, appearances of these words are not necessarily all referring to the same embodiment. Furthermore, the particular features, structures or characteristics may be combined in any suitable manner in one or more embodiments.

Figure 1A:
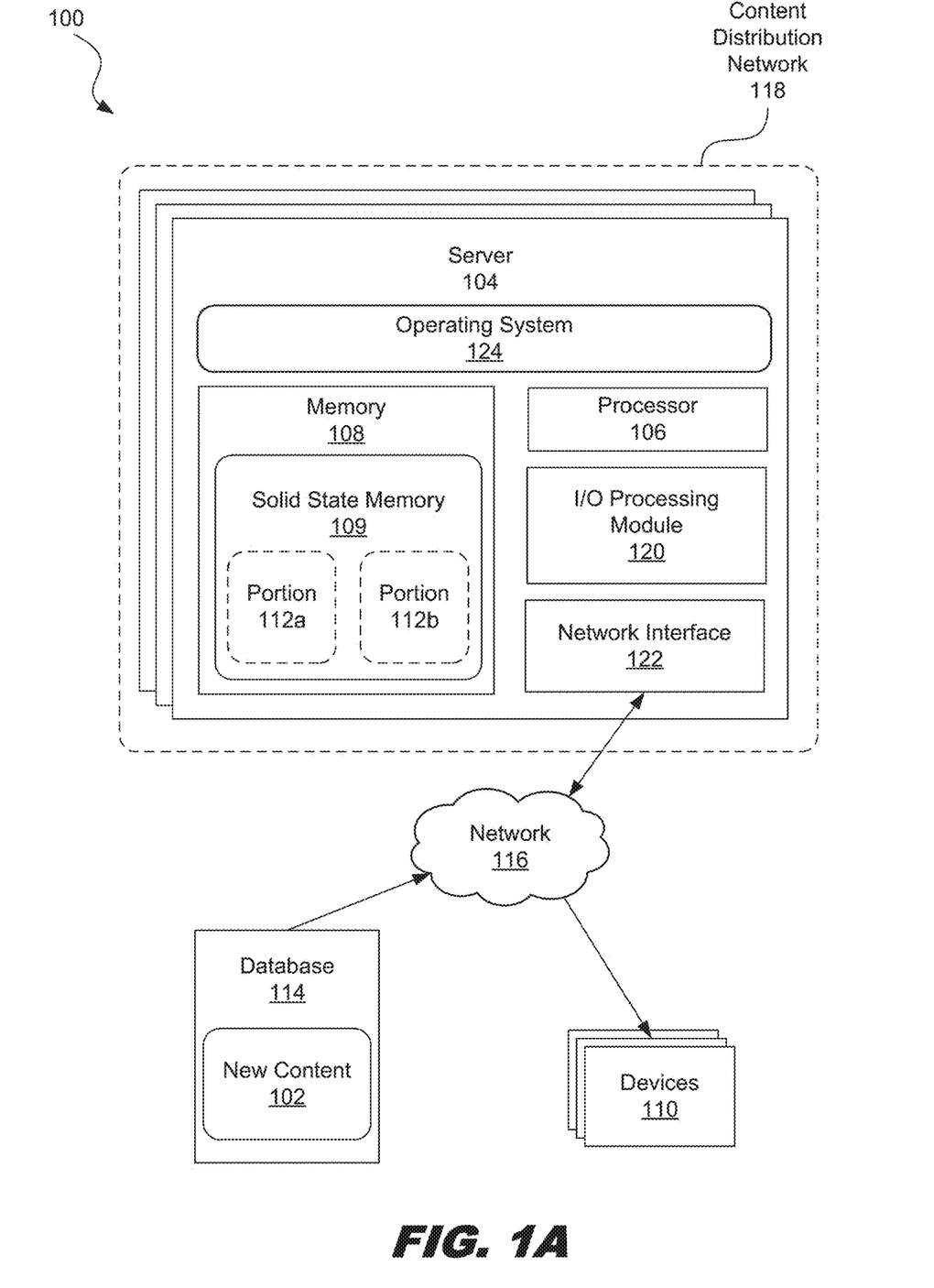
FIG. 1A is a block diagram of a streaming media system that allows users to access streaming media items according to some embodiments of the present disclosure.

FIG. 1 is a block diagram of a streaming media system 100 that allows users to access streaming media content. Other embodiments include download-based media systems. According to the present example, the streaming media system 100 includes a server 104 within a content distribution network 118. The server 104 may be one of several similar servers in the content distribution network 118. The content distribution network 118 may be in communication with a database 114 over a network 116 such as the Internet. The content distribution network 118 may also be in communication with consumer devices 110 over the network 116.

According to the present example, the server 104 includes a processor 106 and a memory 108. The processor 106 may include one or more individual processors or processing cores. Similarly, the memory 108 may include one or more memory devices of different types. The server 104 also includes an I/O processing module 120 and a network interface 122. The memory 108 may include machine readable instructions for execution on the processor 106. Such instructions may be associated with various applications as well as an operating system 124.

The server 104 may be one of a variety of servers. Exemplary servers may include, for example, stand-alone and enterprise-class servers operating a server operating system (OS) such as a MICROSOFT® OS, a UNIX® OS, a LINUX® OS, or another suitable server-based operating system. It should be appreciated that the server 104 illustrated in FIG. 1 may be deployed in other ways and that the operations performed and/or the services provided by such servers may be combined or separated for a given implementation and may be performed by a greater number or fewer number of individual server devices. One or more servers may be operated and/or maintained by the same or different entities. As illustrated, the server 104 is operated by a streaming content service provider, also referred to herein as a streaming content system operator.

The network interface 122 may be a network interface card or network interface controller (NIC) that permits the server 104 to communicate with other devices over the network 116. For example, the network interface 122 allows the server 104 to communicate with the database 114 and client devices 110 over the network 116 and to communicate with other instances of the server 104 within the content distribution network 118. The network interface 122 may utilize a variety of communication technologies including Ethernet, coaxial, fiber optic, and wireless communication technologies.

As noted, the memory 108 may include a plurality of memory modules. The memory modules may be of varying types. Some of the memory 108 may be volatile memory such as Random Access Memory (RAM). Some of the memory 108 may be non-volatile memory such as hard disk drives or SSDs. In the present example, the memory 108 includes a solid state memory 109 such as a NAND flash memory drive.

The memory 108 may store machine-readable instructions for execution on the processor 106. Such instructions may be part of the operating system. The operating system provides various applications, such as web servers and media streaming applications, with access to the server's hardware resources. Such hardware resources include the processor 106, the memory 108, and the network interface 122.

The operating system relies on the I/O processing module 120 to access the solid state memory 109. The I/O processing module 120 includes hardware, software, or a combination thereof to process I/O requests associated with the solid state memory 109. For example, the I/O processing module 120 includes a system call interface. This system call interface may be used by the operating system to perform read and write operations on the solid state memory 109. The I/O processing module 120 may include several functional layers, which together may be referred to as the I/O stack.

Figure 1B:
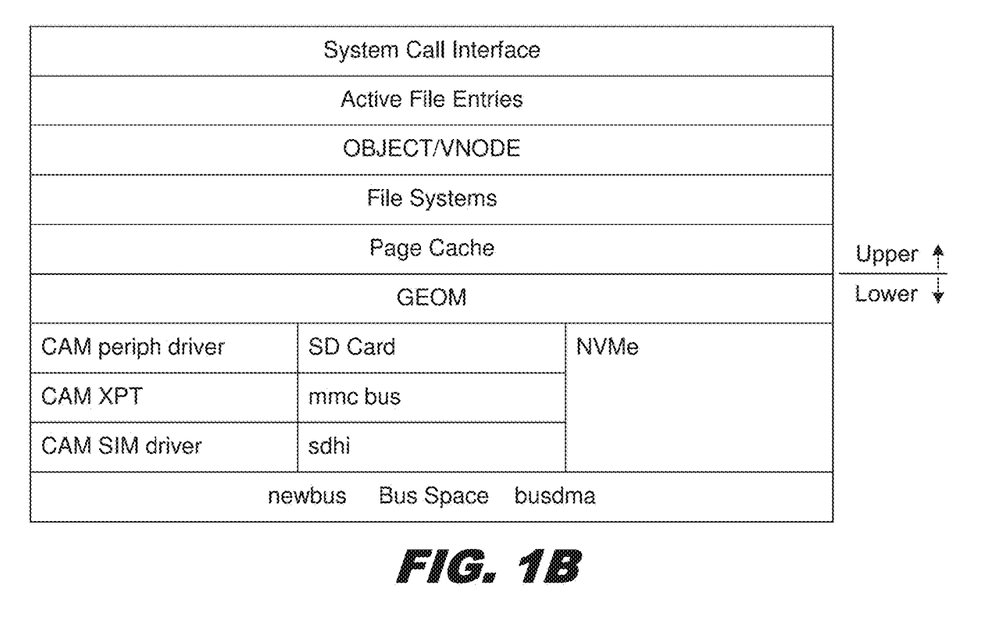
FIG. 1B is a diagram illustrated an I/O stack according to some embodiments of the present disclosure.

One example of an I/O stack, among many suitable I/O stacks, is the FreeBSD I/O stack, an example of which is shown in FIG. 1B. The I/O stack embodiment shown in FIG. 1B includes the highest layer at the top and the lowest layer at the bottom of the figure. An I/O request enters the top of the stack through the system call interface. From there, the I/O request is processed down the layers. Each layer in the stack may generate its own requests (which may be based on requests received from another layer), combine multiple requests together, generate a request for a single higher-level request, or direct requests to multiple places. For purposes of discussion, the layers above the GEOM layer will be referred to as the upper layers of the stack and the GEOM layer and below will be referred to as the lower layers of the stack. In the FreeBSD I/O stack, the GEOM layer is a disk driver layer. It handles drive portioning and other features such as Redundant Array of Independent Disks (RAID), encryption, compression, and scheduling. Below the GEOM layer is a Common Access Method (CAM) subsystem that includes the CAM peripheral driver, the CAM XPT (transport), and the CAM SIM (SCSI interface module or host bus adapter driver) layers.

In operation, the server 104 receives new content 102 from the database 114 over the network 116. For example, a new media item may be transferred from the database 114 to the server 104, from which it may be accessed by users of the streaming content service provider. This data is received by the network interface 122. An application running on the server causes incoming data to be stored on the solid state memory 109 at, for example, portion 112a. To store this data in solid state memory 109, the operating system 124 uses the system call interface of the I/O processing module to perform a write operation. The I/O request associated with the write operation is processed down through the various layers and is eventually written to portion 112a. Additionally, while write operations are being performed, the server 104 receives requests from client devices 110 to stream content to the client devices 110. To provide such content, data is read from the solid state memory 109 at, for example, portion 112b. That data is then passed to the network interface and is eventually sent to the client devices. The server 104 reads data from the solid state memory 109 in a manner similar to writing data. Specifically, the operating system uses a system call through the system call interface of the I/O processing module 120. This creates an I/O request that is processed down through the layers of the I/O stack. Accordingly, the lower level I/O scheduler, which may be included in the I/O processing module 120, may schedule both read I/O requests and write I/O requests concurrently.

Figure 2:
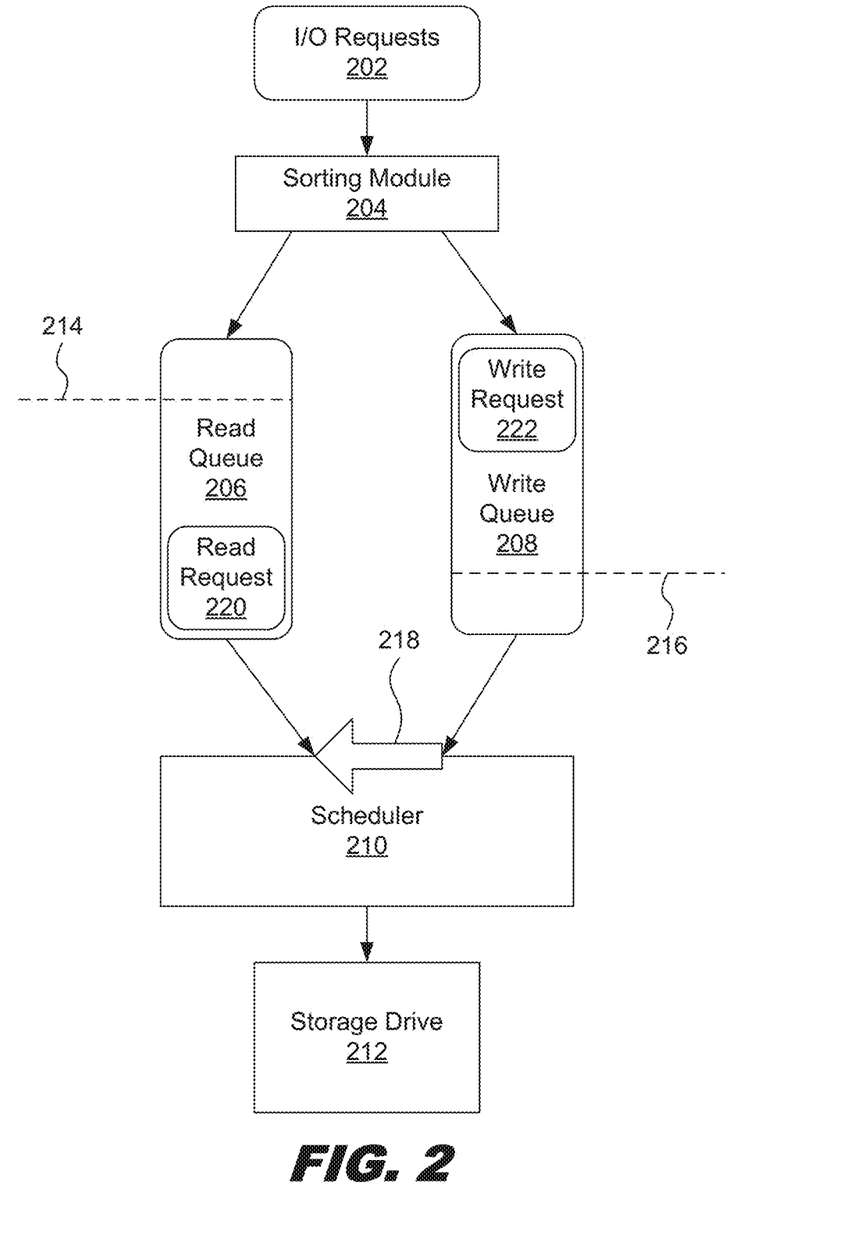
FIG. 2 is a block diagram showing illustrative handling of input/output (I/O) requests according to some embodiments of the present disclosure.

FIG. 2 is a block diagram showing illustrative handling of input/output (I/O) by the I/O processing module 120 of FIG. 1A. According to the present example, I/O requests 202 are sent to a filtering or sorting module 204. The I/O requests 202 include both read requests and write requests. The sorting module 204 may include hardware, software, or a combination of both to sort I/O requests 202 into separate queues 206, 208. The sorting module 204 may be part of the lower level I/O scheduler and the I/O processing module 120 described above. The sorting module 204 places read requests 220 in a read queue 206 and places write requests 222 in a write queue 208. This is different than conventional CAM schedulers in which both read requests and write requests are placed into the same queue.

The scheduler 210 processes requests from both the read queue 206 and the write queue 208. The scheduler 210 may be, for example, part of the lower level I/O scheduler described above. In the present example, read requests 220 and write requests 222 are processed with a bias 218 towards the read queue 206. For example, if there is an I/O request in both of the queues 206, 208, then the scheduler 210 is more likely than not to process a request from the read queue 206 than the write queue 208. If there are I/O requests in only one of the queues 206, 208, and such requests are processed as normal. This bias 218 may be implemented in a variety of ways, as will be described in further detail below.

The scheduler 210 sends the selected read requests 220 and write requests 222 to the storage drive 212. More specifically, the I/O requests may be sent to a device queue that operates on a first in, first out (FIFO) basis. I/O requests exiting the device queue are processed by the memory controller of the storage drive 212. The memory controller of the storage drive 212 may include software and hardware for physically writing and reading data to the storage drive 212. The storage drive 212 may correspond to the solid state memory 109 of FIG. 1A as described above.

More specifically, in some examples, the disk driver layer (e.g., GEOM) transforms an I/O request into the proper absolute offsets on the disk based on the relative offset in the partition. It then passes this to the disk's strategy routine. The peripheral driver places the I/O request into either the read queue 206 or the write queue 208 and then instructs the CAM subsystem to allocate a struct ccb (CAM Control Block) if any slots are available in the device queue. CAM may monitor the number of requests that are outstanding to the device queue and may call a start routine if there are slots free (otherwise it will just return to monitoring). Once the start routine is called, it will try to pull a request from either the read queue 206 or the write queue 208 and fill in the ccb with the appropriate command block for the request. The ccb is then placed in a host bus adapter driver queue (e.g., a SIM queue). An action routine is then called, which delivers the command to the hardware of the storage drive 212 to read data from or write data to the storage drive 212.

In some examples, various limits 214, 216 may be set on either the read queue 206 or the write queue 208. Such limits 214, 216 may apply even if there are more slots available in the device queue. For example, the write queue 208 may have a limit of two write requests 222. If there are already two write requests 222 in the write queue 208, the sorting module 204 may not place any more write requests in the write queue 208. Thus, write requests waiting to be placed in a queue may wait in a buffer associated with a higher layer of the I/O stack.

The limits 214, 216 may be set in a manner that minimizes write amplification. More specifically, the limits 214, 216 may be set such that "garbage collection" performed on the storage drive is limited to one logical block of memory within the storage drive. "Garbage collection" is a process whereby memory cells storing objects that are no longer needed are freed so that new data can be written to those memory cells. Garbage collection functions may be applied to the logical blocks of memory where I/O requests are being applied to read or write data. By limiting the write queue as described above, it is more likely that the garbage collection function will only be applied to a single logical block of memory. This limits the overhead used for garbage collection operations and thus reduces latency, improving the performance of the storage drive 212.

Figure 3:
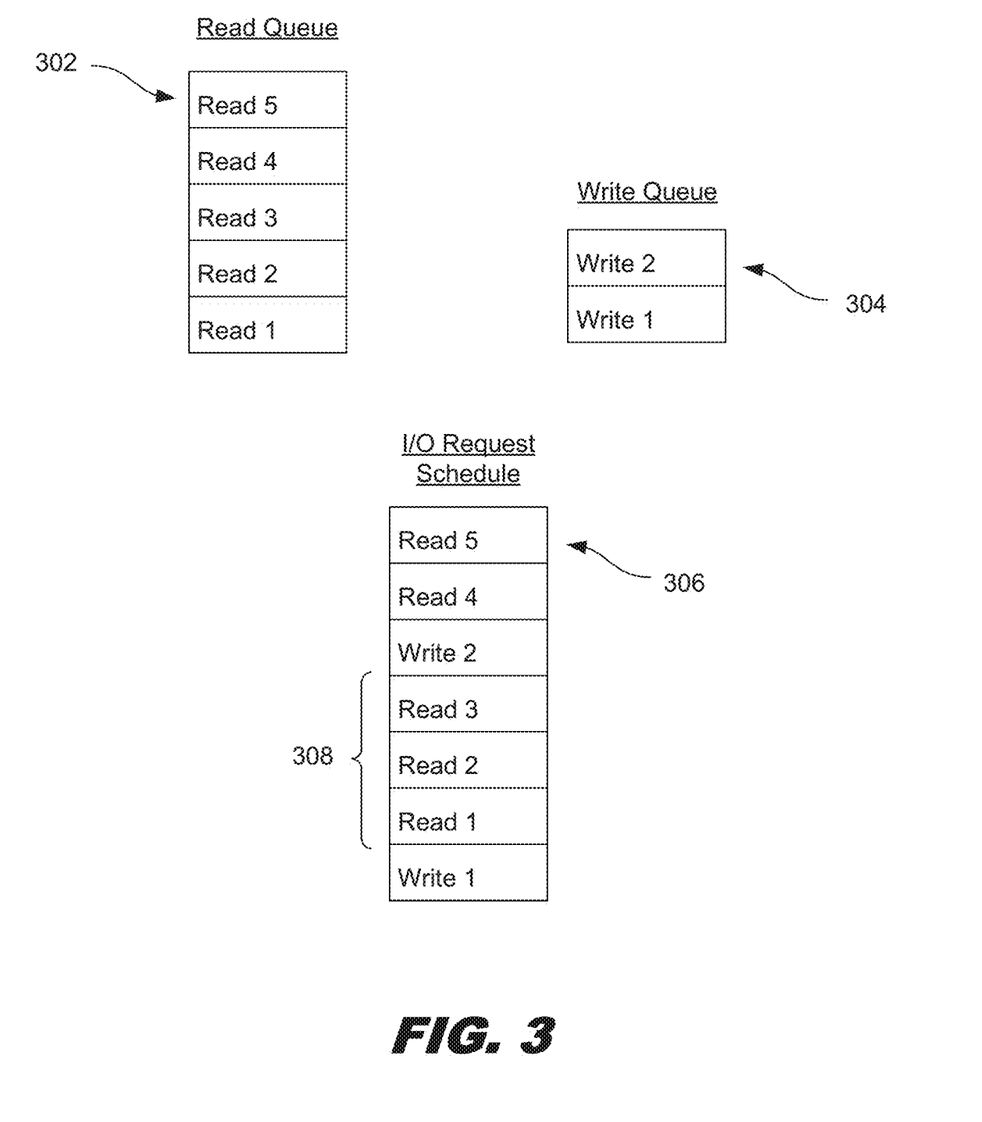
FIG. 3 is a diagram showing illustrative handling of read and write requests according to some embodiments of the present disclosure.

FIG. 3 is a diagram showing an order in which read and write requests are processed. As described above, the scheduler 210 may be designed with a bias towards processing I/O requests from the read queues. This may be done in a variety of ways. In one example, when there are I/O requests in both the read queue and the write queue, the scheduler will only schedule a write request after a threshold number or a predefined number 308 of requests have been processed from the read queue. Table 302 illustrates a set of read requests to be processed from a read queue, like the read queue 206 of FIG. 2. Table 304 illustrates a set of write requests to be processed from a write queue, like the write queue 208. Table 306 illustrates the order in which the scheduler 210 schedules I/O requests from both the read queue and the write queue.

In the present example, the predefined number 308 of read requests that are processed before a write request is three. Thus, after write request 1 is scheduled, three read requests (read request 1, read request 2, and read request 3) are scheduled before any additional write requests (like write request 2) are scheduled. The predefined number 308 of three is given as an example for purposes of discussion. Practical embodiments of principles described herein may use much larger predefined numbers such as 100 or 1000.

In some examples, the predefined number 308 may be static. In other words, a system administrator may select the predefined number 308 based on his or her skill and experience as to what number threshold number will efficiently keep read latency at an acceptable level.

In some examples, the predefined number 308 may be dynamic. In other words, the predefined number 308 may be automatically adjusted in real time based on various factors. For example, the I/O processing module 120 may take into account various conditions associated with the solid state memory 109 and the network 116 over which read operations and write operations are being requested. For example, the predefined number 308 may be adjusted based on network traffic conditions, time of day, and current server load conditions.

In some examples, the predefined number 308 may be adjusted based on a current write amplification value of the solid state memory 109. In one example, write amplification can be quantified by the following equation.

$$A = (U+S)/U \quad \text{(Equation 1)}$$

Wherein, A is the write amplification value, U is the number of user writes, and S is the number of additional writes generated by the drive.

The write amplification value may be affected by a variety of factors. Such factors may include the current workload of the solid state memory drive, the drive history, drive design choices, and firmware implementation. In some examples, the solid state memory drive may be configured to provide the write amplification value to the scheduler in real-time so the scheduler 210 can adjust the predefined number 308 accordingly.

Figure 4A:
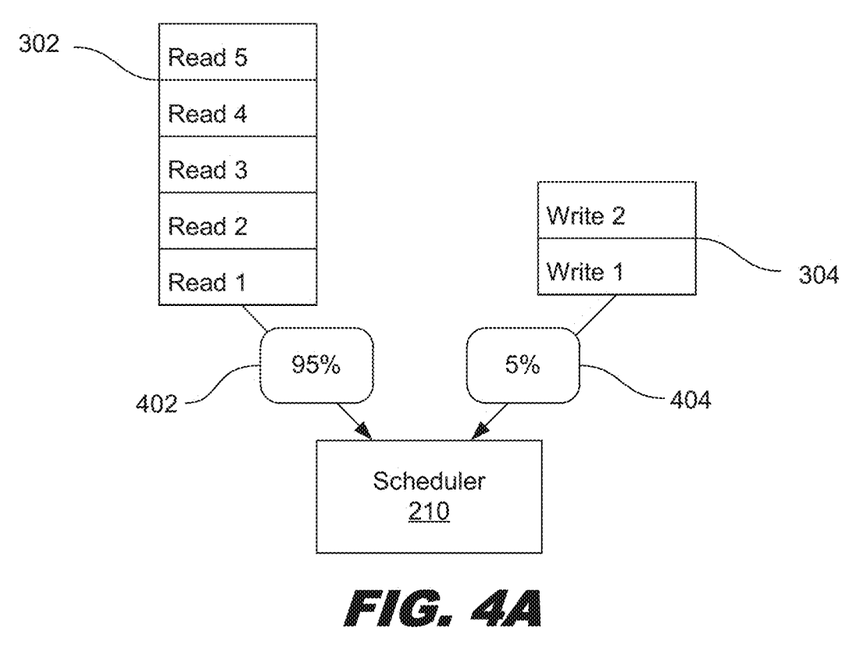
FIGS. 4A and 4B are diagrams showing another illustrative handling of read and write requests according to some embodiments of the present disclosure.
Figure 4B:
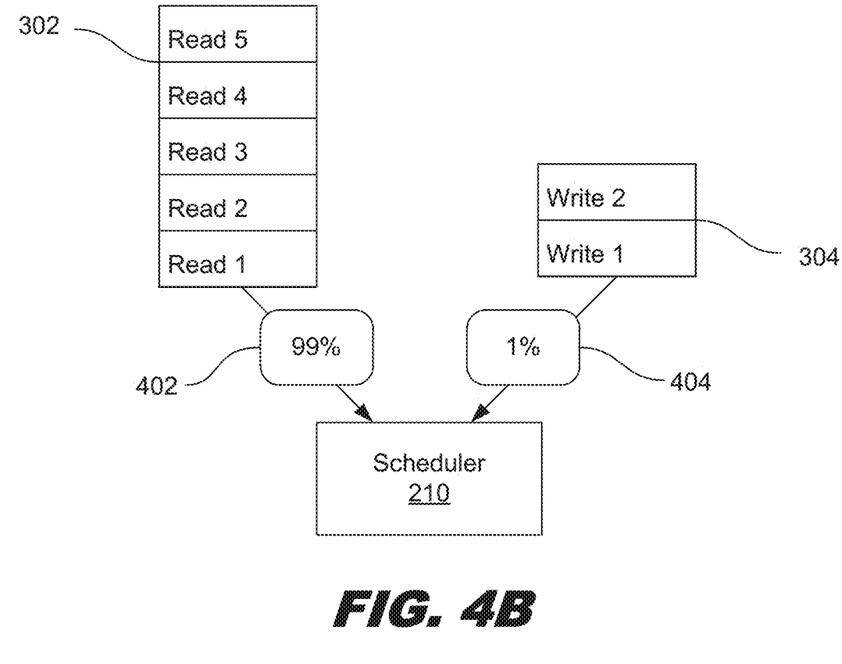

FIGS. 4A and 4B are diagrams showing illustrative handling of read and write requests in the lower portion of the I/O stack. As described above, the scheduler 210 may be designed with a bias towards processing I/O requests from the read queues. In one example, the scheduler 210 is configured to select a request from the read queue a certain percentage of the time and select a request from the write queue the remainder of the time. For example, as shown in FIG. 4A, the scheduler may be configured such that the probability 402 of selecting from the read queue is 95% and the probability 402 of selecting from the write queue is 5%.

In some cases, the probabilities 402, 404 of selecting a request from the read queue over the write queue may be statically defined. In other words, a system administrator may select the probabilities 402, 404 based on his or her skill as to what number will efficiently keep read latency at an acceptable level.

In some examples, the probabilities 402, 404 may be dynamic. In other words, the probabilities 402, 404 may be automatically adjusted in real time based on various factors. For example, the I/O processing module may take into account various conditions associated with the solid state memory drive and the network over which read operations and write operations are being requested. For example, the probabilities 402, 404 may be adjusted based on network traffic conditions, time of day, server load conditions, and the write amplification value. As shown in FIG. 4B, the probabilities have been adjusted such that the probability 402 of selecting from the read queue is 99% and the probability 404 of selecting from the write queue is 1%. In other embodiments, the probability 402 may be 45% while the probability 404 is 55%. This probability may be set by a fixed value or by a dynamic operation.

Figure 5:
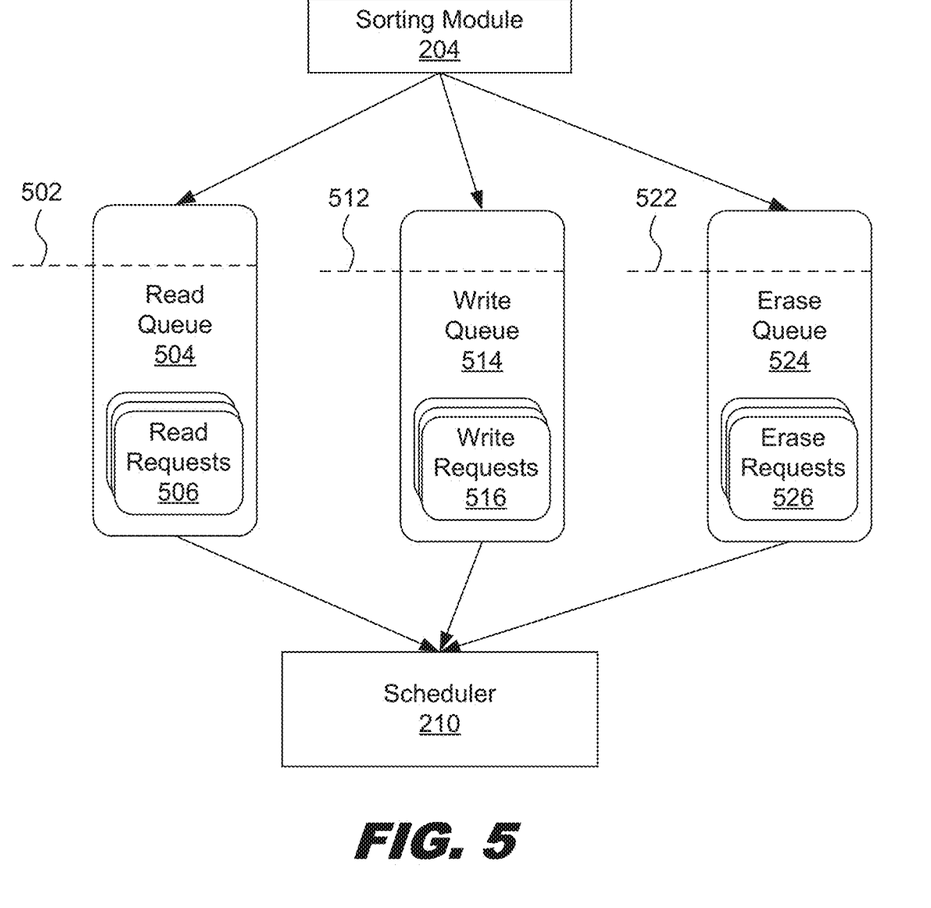
FIG. 5 is a diagram illustrating an erase queue according to some embodiments of the present disclosure.

FIG. 5 is a diagram illustrating an embodiment in which the sorting module 204 of the I/O processing module 120 divides I/O requests into three different queues. Specifically, FIG. 5 illustrates a read queue 504, a write queue 514, and an erase queue 524. A sorting module 204 may place an I/O request into any one of these queues 504, 514, and 524. Specifically, the sorting module 204 may identify a type of received requests and then place read requests 506 in the read queue 504, write requests 516 in the write queue 514, and erase requests 526 in the erase queue 524.

Each queue 504, 514, 524 may have its own independent size limit 502, 512, 522. Thus, each size limit may be independently adjusted by the I/O processing module 120 based on the desired behavior of the memory unit to which the I/O requests are being sent. For example, if performance of the content distribution network 118 is improved by enforcing a preference for write requests 516 over read requests 506, then the limit 502 on the read queue 504 may be set lower than the limit 512 on the write queue 514. Conversely, if it is desired to have a preference for read requests 506 over write requests 516 to improve performance of the content distribution network 118 under certain conditions, then the limit 502 on the read queue 504 may be greater than the limit 512 on the write queue 514. The limit 522 on the erase queue 524 may also be adjusted relative to the write limit 512 and read limit 502 to create the desired behavior for the memory unit to which the I/O requests are being sent.

In some examples, the limits 502, 512, 522 may be statically predefined. In some examples, however, the limits 502, 512, 522 may be dynamically adjusted in real time based on various conditions associated with the memory unit. Such conditions may be similar to the conditions described above for dynamic adjustment.

Figure 6:
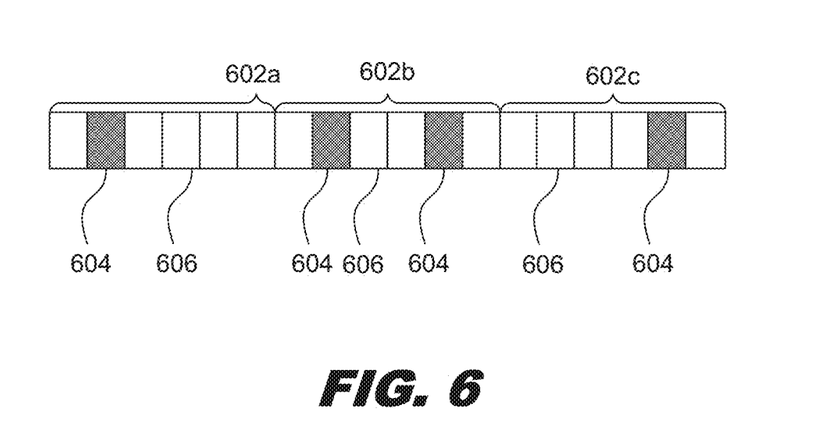
FIG. 6 is a diagram illustrating throttling of write requests according to some embodiments of the present disclosure.

FIG. 6 is a diagram illustrating throttling of write requests. FIG. 6 illustrates three separate, consecutive time periods 602a, 602b, 602c. In some examples, the number of write requests 604 relative to other requests 606 (e.g. read requests and/or erase requests) may have a limit per time period. For example, write requests 604 may be limited to two per time period 602a, 602b, and 602c. Thus, there may be one write request 604 per time period as shown in time periods 602a and 602c. Or, there may be two write requests in a time period as shown in time period 602b. The limit per time period may be enforced by the I/O processing module 120 operating in the lower portion of the I/O stack to prevent three or more write requests 604 during any of periods 602a-c.

Figure 7:
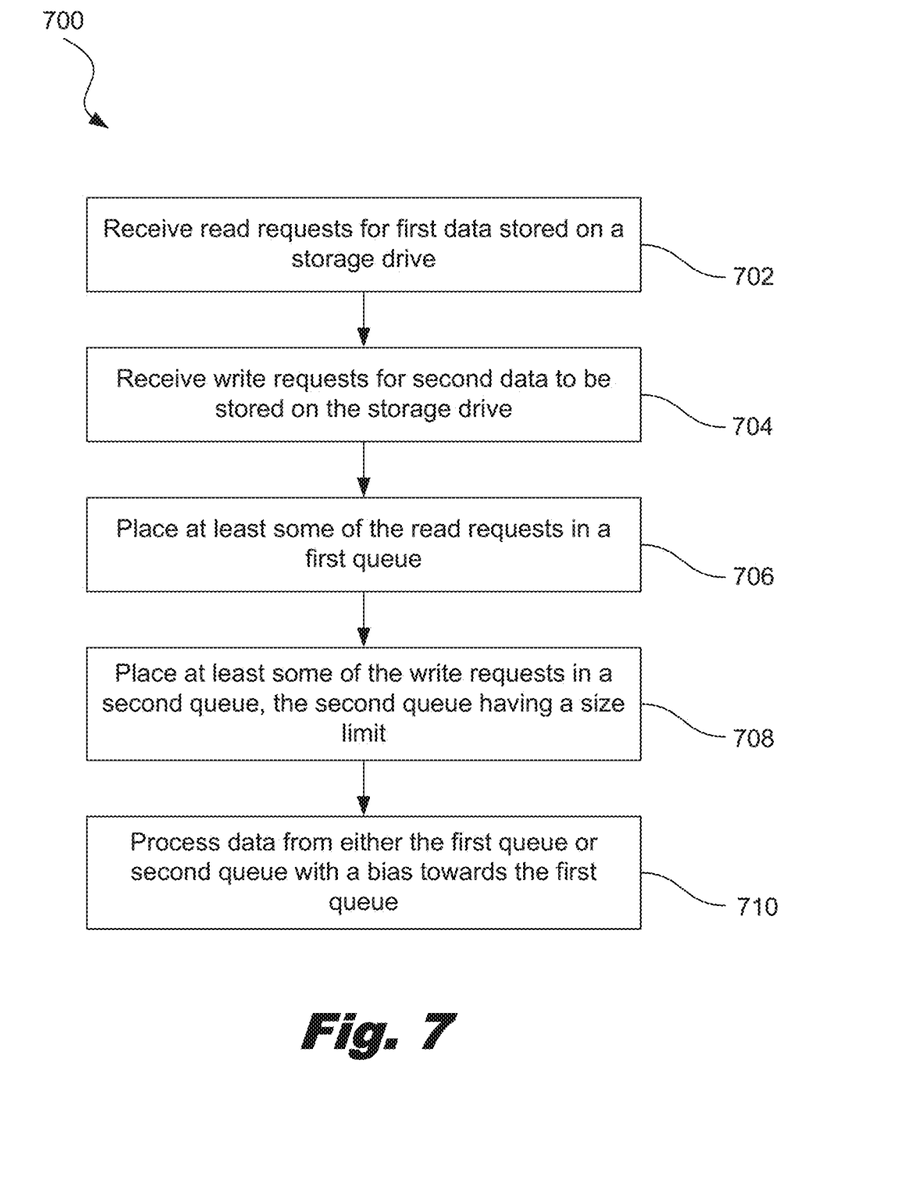
FIG. 7 is a flowchart showing an illustrative method for managing I/O requests according to some embodiments of the present disclosure.

FIG. 7 is a flowchart showing an illustrative method 700 for managing I/O requests in the lower portion of the I/O stack. The method 700 is illustrated as a series of enumerated steps or operations. Embodiments of the method 700 may include additional operations before, after, in between, or as part of the enumerated operations shown in FIG. 7. Furthermore, some embodiments of the method 700 may omit one or more of the enumerated operations. The method 700 may be performed by the I/O processing module 120 of FIG. 1A, the scheduler 210, or other processing devices described herein.

According to the present example, at operation 702, the method includes receiving read requests for first data stored on a storage drive. For example, a server 104 within a content distribution network 118 may receive read requests originating from client devices 110 of FIG. 1A. The read requests are for reading content from the server 104 to be streamed or downloaded to the client devices 110. For example, the read requests may be requests to read one or more media items from the solid state memory 109.

At operation 704, the method 700 includes receiving write requests for second data to be stored on the storage drive. The write requests may originate from a content database 114. The write request may be for updating content stored in the memory 108 on the server 104. For example, new content 102, which may include one or more media items that are not already present in the memory 108 may need to be transferred to the content distribution network 118 to facilitate time-sensitive distribution to client devices 110, which may be distributed around a country or around the globe. For reasons described above, the concurrent reading and writing to the memory units of the storage drive (like the solid state memory 109 of the memory 108) can increase read latency, thereby reducing streaming quality. To mitigate this, the I/O processing module 120 of the server 104 may filter or sort requests into two or more separate I/O queues.

At operation 706, the method 700 includes placing at least some of the read requests in a first queue. The first queue may be referred to as a read queue, like the read queue 206 of FIG. 2. At operation 708, the method 700 includes placing at least some of the write requests in a second queue. The second queue may be referred to as a write queue, like the write queue 208. The first queue and/or the second queue may have a size limit or frequency limit. In some examples, the size limit may be one, which may limit the number of concurrent write requests sent to the solid state memory 109, which may keep in-flight data smaller than a single logical NAND block in the solid state memory 109.

At operation 710, the method 700 includes processing data from either the first queue or second queue with a bias towards the first queue. For example, the scheduler 210 of the I/O processing module 120 may have a 95% probability of selecting a request from the first queue and a 5% probability of selecting a request from the second queue. The probability may be instituted by a counter, a timer, or by a probabilistic circuit or routine. By limiting the write requests in this manner relative to the read requests, read latency may be substantially reduced while allowing for both concurrent read and write requests. Thus, a content server, like the server 104, does not have to be taken offline while being updated, but may continue to provide content to client devices 110 while new content 102 is added to the solid state memory 109.

Figure 8A:
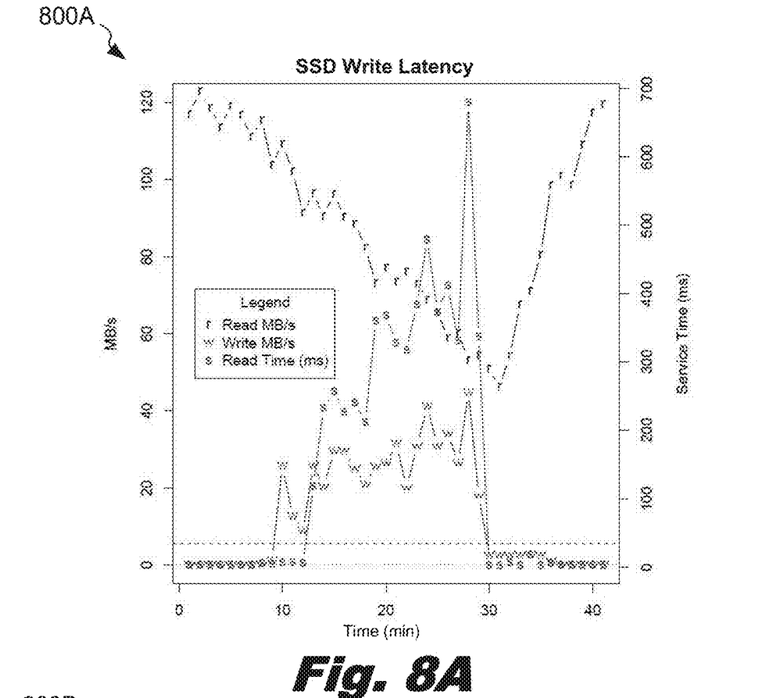
FIGS. 8A and 8B are graphs showing test results of systems under workloads, with FIG. 8B showing latency when utilizing embodiments of the present disclosure.
Figure 8B:
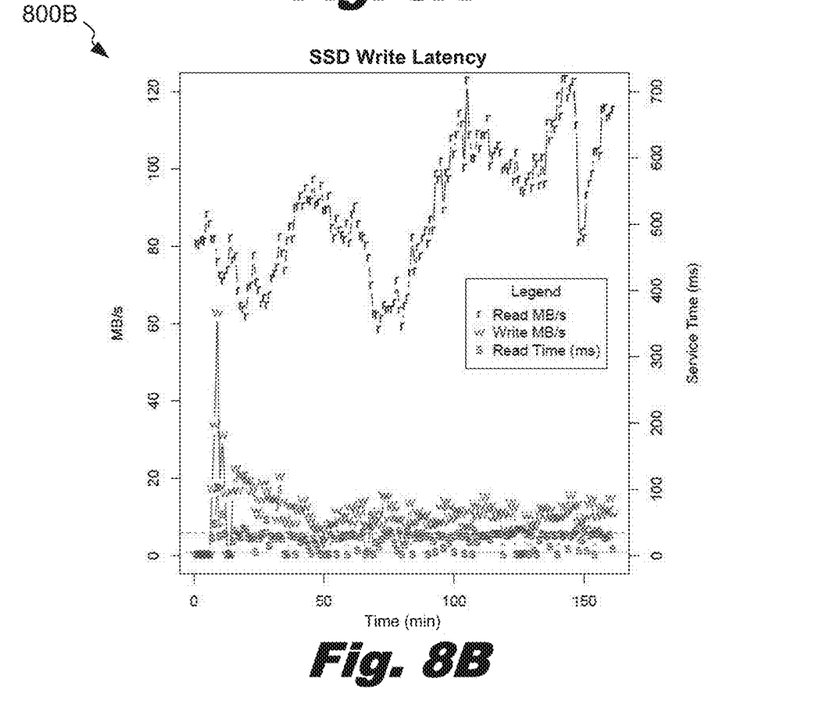

FIG. 8A is a graph 800A showing latency metrics associated with a content distribution server without implementing any embodiments of the present disclosure. FIG. 8A shows a dotted horizontal line showing a normal latency of 5 ms, while dashed horizontal line shows an acceptable latency of 35 ms. The "s" line shows the read time associated with the system under load conditions with read and write requests. As the number of write requests increase, the read times in MB/s decrease substantially, and the service time spikes. These spikes can be 100× or more above normal values. FIG. 8B is a graph 800B showing latency metrics associated with a content distribution server that implemented a particular embodiment of the present disclosure. The graph shows that the write rate is about 25% lower than without the implemented lower level I/O scheduler. With the implemented lower level I/O scheduler, read latency no longer spiked up by a factor of 100×, but was limited to only about a 4× rise (20-30 ms) in general. The graphs 800A and 800B demonstrate the improvement in performance provided by an exemplary implementation of aspects of the present disclosure.

Embodiments of the presently disclosed systems and methods described herein permit a media system, whether a download-based media system or a streaming media system, to provide improved latency conditions while both providing content to users and being updated with new media items for distribution. The problems overcome by the systems and methods described herein are improve the functioning of the solid-state drive to provide this improve latency. Certain aspects of the present disclosure are set out the following numbered clauses:

What is claimed is:

1. A system comprising:
a processor; and
a memory storing machine-readable instructions that when executed by the processor, cause the system to perform operations comprising:
receiving read requests for first data stored on a solid-state storage drive;
receiving write requests for second data to be stored on the storage drive;
placing at least some of the read requests in a first queue;
placing at least some of the write requests in a second queue, the second queue having a size limit;
calculating a current write amplification value for the solid-state storage drive, the write amplification value indicating, for at least one of the write requests, a measure of user write operations currently directed to the solid-state storage drive compared with a greater number of additional, storage-drive-generated write operations needed to complete the user write operations; and
processing data at a disk driver layer from the first queue and the second queue in a manner such that selection of a request from either queue is biased towards the first queue,
wherein a probability selected from choosing a read request in the first queue and choosing a write request in the second queue is dynamically adjustable in real time, the dynamic adjustments to the probability being based on one or more real-time operating conditions of the solid-state drive including the calculated write amplification value.

2. The system of claim 1, wherein processing data from both the first queue and the second queue comprises processing a first write request after a threshold number of the read requests have been processed since an immediately previous write request.

3. The system of claim 1, wherein processing data from both the first queue and the second queue includes assigning a first probability of selecting a request from the first queue and assigning a second probability of selecting a request from the second queue, the first probability being greater than the second probability.

4. The system of claim 1, wherein biasing towards the first queue is provided by a timer that defines a first time period during which the first data is processed from the first queue and a second time period during which the second data is processed from the second queue.

5. The system of claim 1, wherein the size limit of the second queue is a predetermined static limit.

6. The system of claim 1, wherein the disk driver layer is a GEOM layer in an I/O stack of an operating system.

7. The system of claim 1, wherein the size limit of the second queue is dynamically adjusted in real time.

8. The system of claim 1, wherein the size limit of the second queue is set such that garbage collection performed on the storage drive is limited to one logical block of memory within the storage drive.

9. A method performed by a computing system, the method comprising:
   receiving a plurality of input/output (I/O) requests for a storage drive;
   sorting the I/O requests into a read queue and a write queue;
      calculating a current write amplification value for the solid-state storage drive, the write amplification value indicating, for at least one of the I/O requests, a measure of user write operations currently directed to the solid-state storage drive compared with a greater number of additional, storage-drive-generated write operations needed to complete the user write operations; and
      processing, at a disk driver of an I/O stack of the computing system, the I/O requests from the read queue and write queue such that there is a bias towards processing I/O requests from one of the read queue and the write queue, wherein a probability selected from choosing an I/O request from the read queue and choosing an I/O request from the write queue is dynamically adjusted in real time, the dynamic adjustments to the probability being based on one or more real-time operating conditions of the storage drive including the calculated write amplification value.

10. The method of claim 9, wherein the bias is towards processing the write queue.

11. The method of claim 9, wherein the bias is towards processing the read queue.

12. The method of claim 9, wherein sorting the I/O requests further comprises sorting the I/O requests into the read queue, the write queue, and an erase queue.

13. The method of claim 9, further comprising placing a first limit on the read queue and a second limit on the write queue, the first limit being independent from the second limit.

14. The method of claim 13, further comprising dynamically adjusting at least one of the first limit and the second limit.

15. The method of claim 9, wherein the storage drive is a flash drive.

16. A method performed by a computing system, the method comprising:
   receiving a plurality of input/output (I/O) requests for a solid-state storage drive;
   sorting, at a disk driver layer in an I/O stack, the I/O requests into a read queue and a write queue;
   placing a user-defined limit on a size of the write queue;
   calculating a current write amplification value for the solid-state storage drive, the write amplification value indicating, for at least one of the I/O requests, a measure of user write operations currently directed to the solid-state storage drive compared with a greater number of additional, storage-drive-generated write operations needed to complete the user write operations; and
   processing the plurality of input/output requests including placing a bias towards processing the read queue, wherein a probability selected from choosing an I/O request from the read queue and choosing an I/O request from the write queue being is dynamically adjustable in real time, the dynamic adjustments to the probability being based on one or more real-time operating conditions of the solid-state storage drive including the calculated write amplification value.

17. The method of claim 16, further comprising, limiting a rate at which the I/O requests are processed from the write queue.

18. The method of claim 16, wherein the write queue has a predefined static limit.

19. The method of claim 9, wherein the write queue has a predefined static limit.

20. The method of claim 16, wherein a size limit of the write queue is dynamically adjusted in real time.

\* \* \* \* \*